United States Patent [19]

Bienert et al.

[11] 4,050,509
[45] Sept. 27, 1977

[54] DOWN-PUMPING HEAT PIPES

[75] Inventors: Walter B. Bienert; Milton F. Pravda, both of Baltimore, Md.

[73] Assignee: Dynatherm Corporation, Cockeysville, Md.

[21] Appl. No.: 736,548

[22] Filed: Oct. 28, 1976

[51] Int. Cl.² ............................................. F28D 15/00
[52] U.S. Cl. ....................................... 165/45; 165/105
[58] Field of Search ................................. 165/45, 105

[56] References Cited

U.S. PATENT DOCUMENTS

| 2,068,549 | 1/1937 | Knight | 165/105 X |
| 3,195,619 | 7/1965 | Tippman | 165/105 X |
| 3,217,791 | 11/1965 | Long | 165/105 X |
| 3,951,204 | 4/1976 | Movick | 165/106 X |

Primary Examiner—Albert W. Davis, Jr.
Attorney, Agent, or Firm—A. H. Caser

[57] ABSTRACT

Down-pumping heat pipes are provided to augment natural earth heat when used in association with conventional or up-pumping heat pipes for the purpose of maintaining an area such as a roadway free of ice and snow.

10 Claims, 17 Drawing Figures

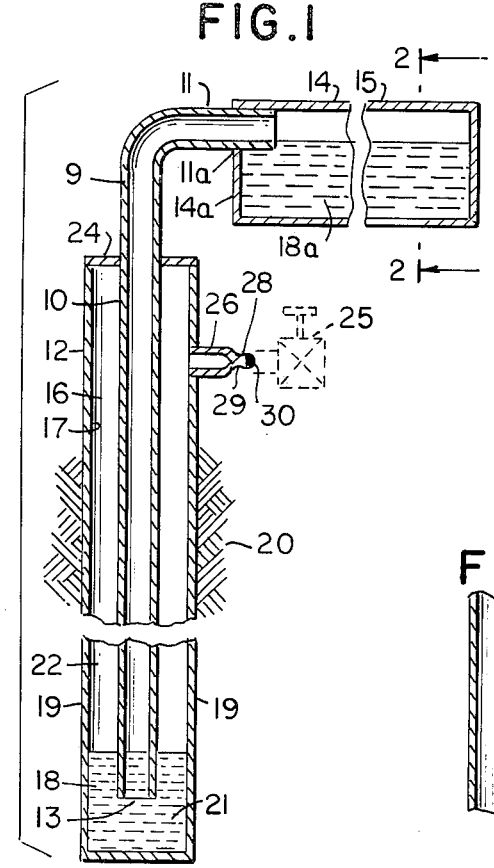
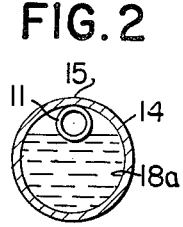
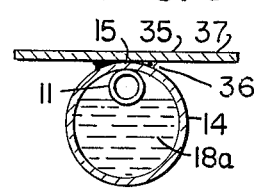
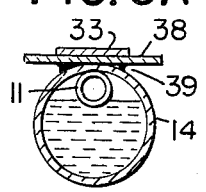
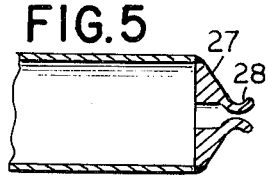
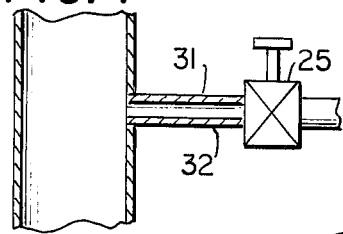
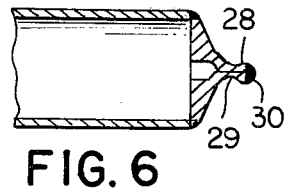
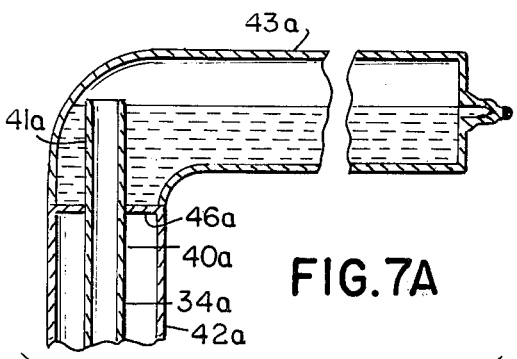
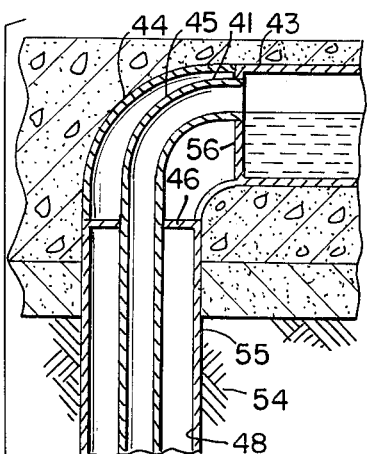
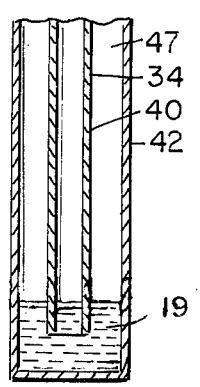
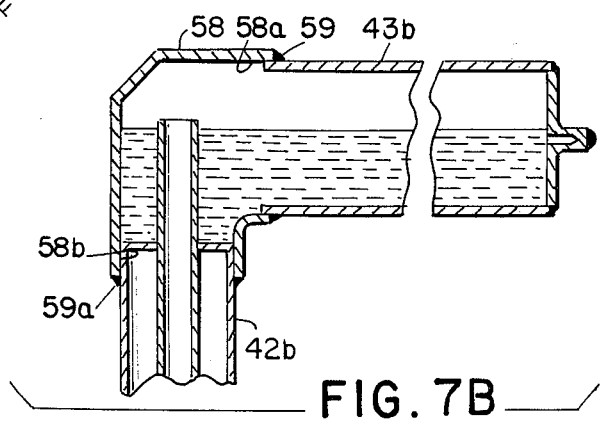

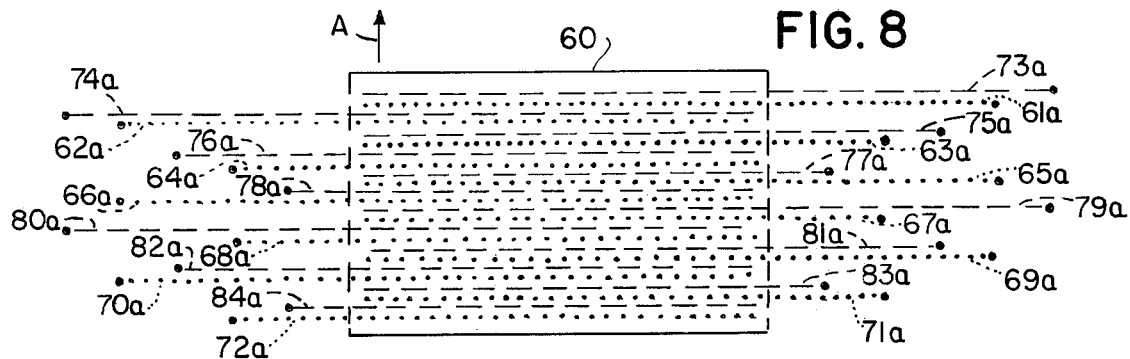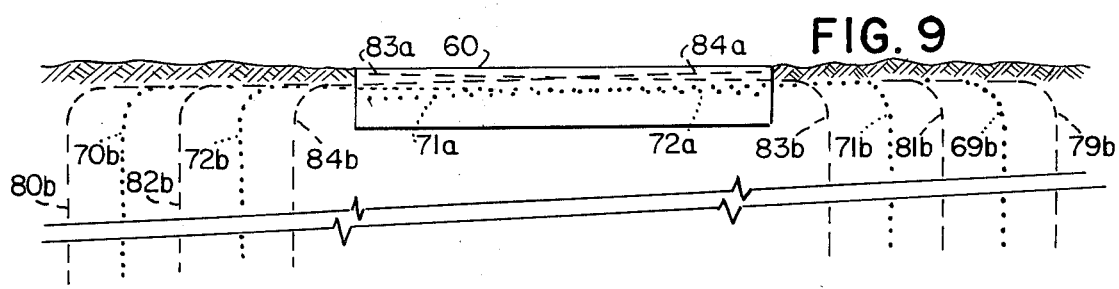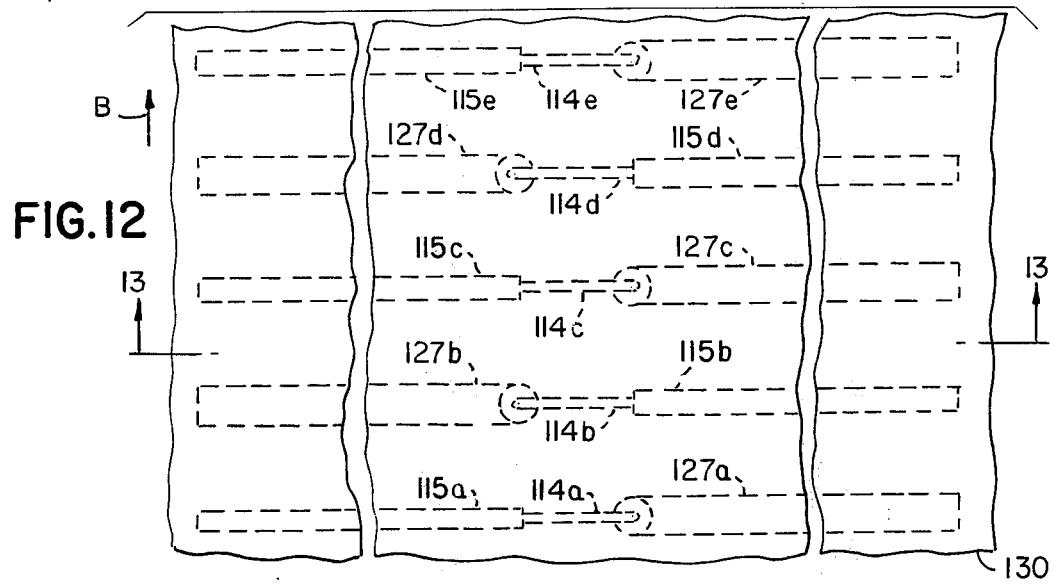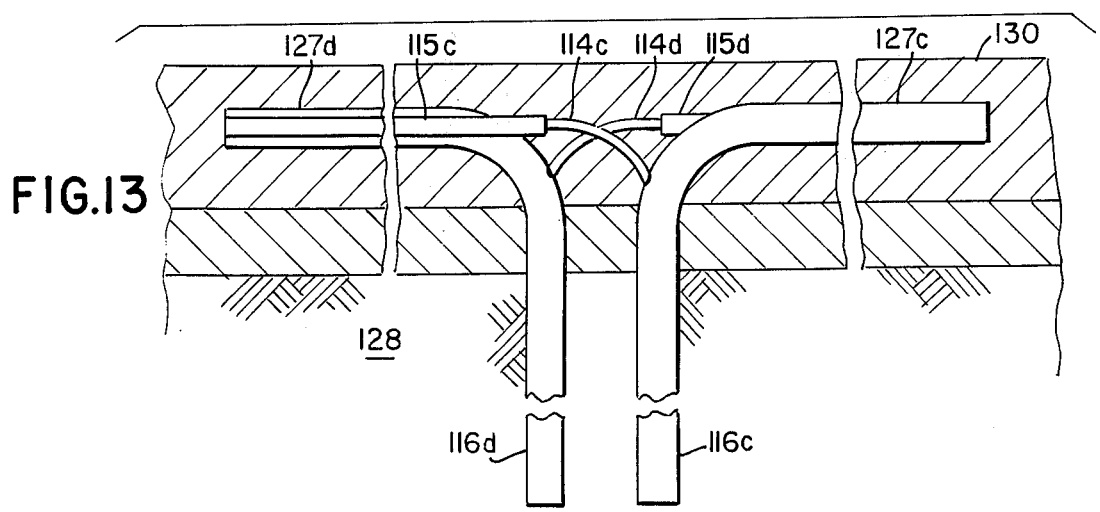

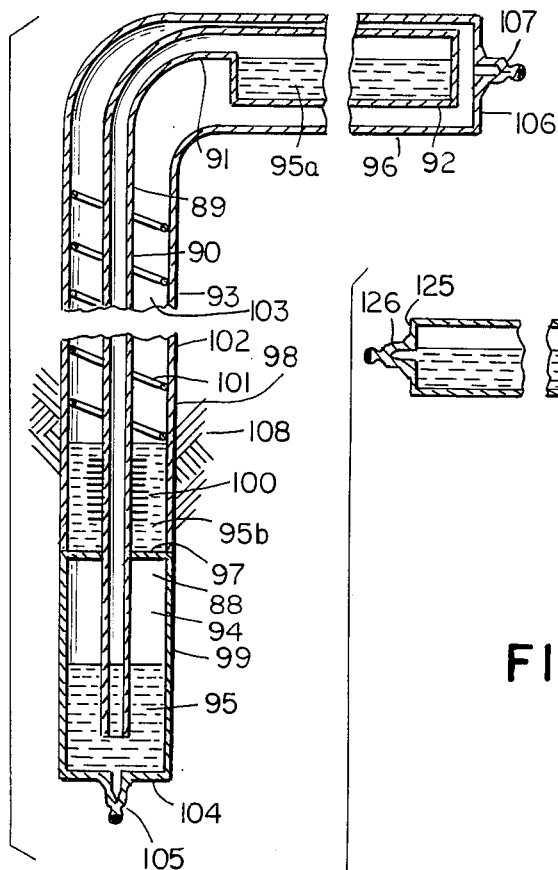
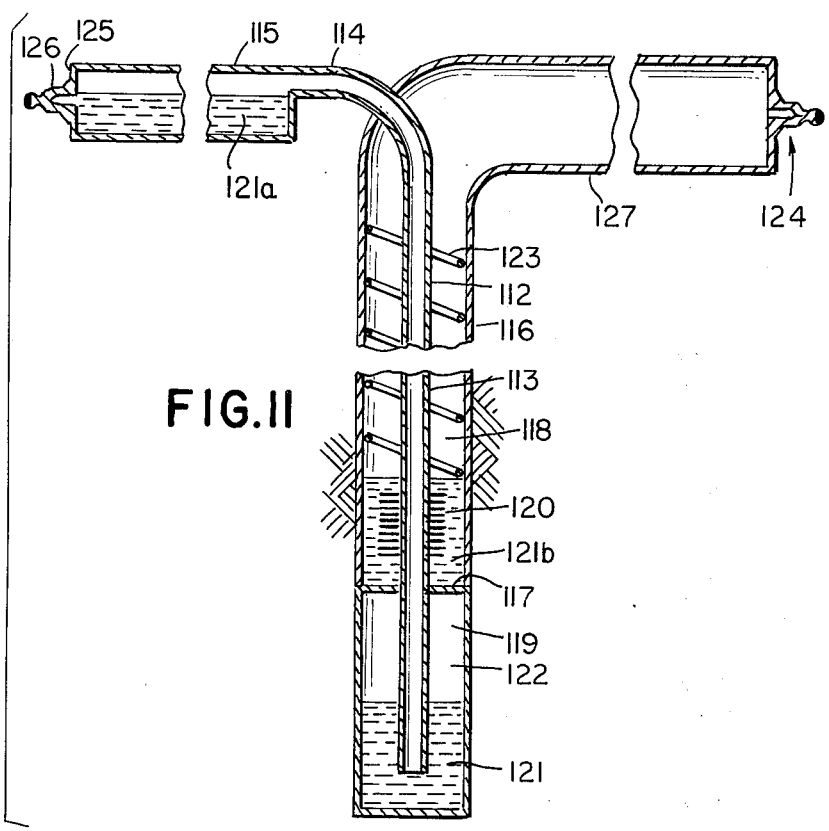
FIG. 10
FIG. 11
FIG. 14

DOWN-PUMPING HEAT PIPES

CROSS-REFERENCE TO RELATED APPLICATION

This application describes a combination pipe which incorporates an up-pumping heat pipe having some features similar to that shown in copending case Ser. No. 665,910. filed Mar. 11, 1976.

BACKGROUND OF THE INVENTION (1) The field of the invention comprises heat pipes for maintaining roadways and other areas free of ice, snow, and slush accumulations in colder weather by utilizing natural earth heat to melt the same, a process that involves depletion of the supply of earth heat, and, in particular, it comprises the conservation of earth heat by providing a device effective in warmer weather to augment the depleted supply of heat. (2) It is known that in summer energy is added to the earth by the ambient air and by solar radiation. Thus, a previously cooled body of earth, such as one containing up-pumping heat pipes, may be heated in this way by vertical downward conduction of heat from the surface, and it may receive even more heat by lateral conduction from contiguous surrounding earth, which itself receives heat by vertical downward conduction. But these are natural processes. So far as is known, the present invention, which aims at increasing the downward vertical conduction of heat in warmer weather, is new.

SUMMARY OF THE INVENTION

The down-pumping heat pipe, as indicated, is for use in a body of earth in which are disposed up-pumping heat pipes which during cold weather transfer heat from the ground to the surface of an area. The down-pumping pipe comprises two intercommunicating branches or branch tubes, one disposable horizontally in the roadway or other area just below the surface thereof, and the other disposable vertically in the ground and/or adjacent said roadway. The ground branch is enclosed by an outer vessel and is in communication with it, and in such vessel is a supply of an inert non-condensible gas such as argon. During normal use this gas does not enter the ground branch. Also in the pipe is a supply of a working agent, such as ammonia, which normally flows between the lower portion of said vessel and the said roadway branch, the flow path including said ground branch. In summer or warm weather time, when the device is operative, the ammonia in the roadway branch is vaporized by atmospheric and solar heat, flows into and through the ground branch, and then into said vessel where it encounters the argon and is condensed, at least in part, by the lower temperatures prevailing in the ground. Heat of condensation is thus released to the walls of the vessel and in turn to the surrounding earth, thereby replenishing the natural supply. As downward flow of the ammonia continues, some of its vapors mix with the argon in the space over the condensed ammonia, forming a gaseous mixture whose pressure gradually increases and eventually reaches a value greater than that in the roadway branch, if any ammonia is still there, and under the force of this higher pressure the condensed ammonia in the lower portion of the vessel is forced back through the ground branch and into the roadway where it collects and is ready for a repetition of the foregoing steps.

The down-pumping pipe has the advantage of being a completely passive device with a long service life and the characteristic of operating cyclically, being activated by temperature differences between the roadway and ground branches. Its major advantage is that it permits increased and more rapid replenishment of the earth heat supply. As an example, temperature changes in the center of a field of 19 up-pumping heat pipes with and without the benefit of down-pumping were determined for a winter-summer-winter span of time and showed that the average ground temperature in the center of the heat pipe field during the second winter season was 7° F. higher with the benefit of down-pumping than without. Because the earth temperature was low to begin with (55° F. in Baltimore) and because the minimum useable earth temperature needed to perform the snow melting function with this system was well above 32° F. (43° F. in Baltimore), a 7° F. increase in average earth temperature achieved with the benefit of down-pumping corresponds to a 45% increase in thermal driving potential. Practically, such a benefit means that in milder climates the earth heat pipe system can handle more severe storms, or that the system can be used in colder climates, or that the number of up-pumping heat pipes can be reduced. A further advantage of the invention is the provision of a combination pipe comprising the incorporation of an up-pumping heat pipe in the down-pumping heat pipe to form a single device installable as such in the ground.

BRIEF DESCRIPTION OF THE DRAWINGS

The invention is illustrated in the accompanying drawings, which are diagrammatic, and in which FIG. 1 is a broken, longitudinally sectioned view of a downpumping heat pipe with a portion (explained below) shown in broken lines;

FIG. 2 is a sectional view along line 2—2 of FIG. 1;

FIG. 3 is a view like FIG. 2 but showing a modification;

FIG. 3a is a view like FIG. 2 but showing another modification;

FIG. 4 is a view like FIG. 1 but showing a modification and also showing the roadway branch of the pipe embedded in a paving slab and the ground branch extending into the supporting earth;

FIGS. 5 and 6 are enlarged fragmental views, in section, of filling means for the pipe of FIG. 4;

FIG. 7 is an enlarged fragmental view, in section, of filling means for the pipe of FIG. 1;

FIG. 7a and 7b are broken partial views, in section, of modifications of FIG. 4;

FIG. 8 is a simplified plan view of a paving slab showing an arrangement of up-pumping and down-pumping heat pipes;

FIG. 9 is a simplified broken end view of the slab of FIG. 8;

FIG. 10 is a broken, longitudinally sectioned view of a downpumping heat pipe having combined therewith an up-pumping heat pipe;

FIG. 11 is a view like FIG. 10 but showing a modification;

FIG. 12 is a broken plan view of a roadway showing a disposition of the down-pumping heat pipes of FIG. 11;

FIG. 13 is a sectional view along line 13—13 of FIG. 12; and

FIG. 14 is a broken partial view of a modification of FIG. 10.

DESCRIPTION OF SPECIFIC EMBODIMENTS

Referring to FIGS. 1 and 2, the down-pumping heat pipe shown there comprises an inner pipe or tube 9 divided into a ground or vertical branch tube 10 and a horizontal or roadway branch tube 11, these being intercommunicating and angularly disposed relatively to each other. Branch 10 is throughout most of its length enclosed by a vessel 12 and in communication with it through the lower open end 13, while branch 11 includes or is attached to a horizontal chamber or vessel 14 whose upper surface 15 is disposable in the roadway surface. A non-condensible gas like argon, designated 16, is present in the space 17 of vessel 12, and a working agent 18, 18a, such as ammonia, is present in the device, being shown in the bottom portion of branch 10 and vessel 12 and in the chamber 14.

In summer or warm weather the ammonia in chamber 14 is heated and vaporized by virtue of the proximity of the chamber to the roadway surface which receives heat from the sun and the warm atmosphere. The resulting vapors flow through opening 11a in the upper part of wall 14a of chamber 14 and then downwardly through branches 11 and 10 to the bottom of vessel 12 where they are condensed by the cooler ground temperatures and heat of condensation thus released heats the walls 19 of vessel 12 and also the surrounding earth 20. In time, part of the vapors are not condensed but bubble through the pool 21 of ammonia and into the space 17 above where they encounter and mix with the argon 16, forming a gaseous mixture designated 22 whose pressure gradually increases in the confined space 17, which, it may be noted, is sealed at the top by the wall 24. As more ammonia is vaporized in chamber 14, more is condensed in pool 21, more heat of condensation is released, and more ammonia vapor joins the mixture 22. Eventually the mixture attains a pressure large enough to overcome the driving force heretofore operative in chamber 14, at which point the chamber may or may not be depleted of ammonia, and to force condensed ammonia from pool 21 back through branches 10 and 11 into the chamber. Such reverse flow continues until the respective driving forces are in balance, and the flow will again become downward when the pressure in chamber 14 is larger than that in vessel 12.

In order to charge the device with argon and with ammonia, a valve 25, shown in broken lines, is connected to an inlet pipe 26 which is provided with an open end wall 27 (FIG. 5) having a flared end extension 28. The argon and ammonia from sources not shown are separately introduced in desired amounts by suitable connections, not shown, through the open valve 25, the latter is then closed, the extension 28 is then pinched shut as at 29, the valve 25 is removed, and the extension further closed as by welding or soldering at 30. Alternatively, vessel 12 may have connected to it a straight inlet pipe 31 (FIG. 7) to which valve 25 is attached, and after charging is accomplished, this valve is closed, pipe 31 is pinched shut at 32, the valve removed, and the remaining free end of pipe 31 welded or soldered shut. Either of the foregoing procedures may be used for any of the modifications of the invention.

An advantage of the device of FIG. 1 is its simplified construction. The device was employed for testing the invention, as described in the example below.

In the modification of FIG. 3, a flat metal plate 35 is welded at 36 to the upper surface 15 of chamber 14 to serve as a heat collector. The upper surface 37 of the plate may, if desired, be suitably treated or coated to increase the heat absorption capacity. For example, it may be blackened as by painting it, e.g., with 3M Black Velvet paint; or by oxidizing it, e.g., with a commercial agent known as "Ebanol"; although any other suitable paint or oxident may be employed.

In FIG. 3a a similar heat absorption plate 38, welded at 39 to chamber 14, is used to which is attached an electrical heating device 33, this modification having been used for test purposes, as set forth below in greater detail in the example.

FIG. 4 shows a preferred modification positioned in a roadway and the associated earth and comprising the inner pipe or tube 34 from which are formed the angularly disposed intercommunicating ground and roadway branches or branch tubes 40, 41, the vertically disposed vessel 42 enclosing branch 40, and the horizontal vessel or chamber 43 to which branch 41 is connected. Vessel 42 is joined to chamber 43 by an elbow which encloses the curved portion 45 between branches 40 and 41, thus affording some protection therefor, and further providing an outer envelope of uniform diameter which eases handling and installation. It should be noted that in a preferred form of the invention the vessels 42 and 43 are originally in the form of a single straight pipe and are transported to the site of use in such form, and that this pipe is bent on the site to produce vessels 42 and 43; the barrier 46 and chamber end wall 56 help confine the bending of the pipe to the desired location, forming the elbow 44. The portion 44 does not transmit any fluids, since vessel 42 is sealed at its upper end by the internal plate 46. Argon gas 47 is present in the space 48 and ammonia 49 and 49a is present in the lower portion of vessel 42 and in chamber 43, as shown. Both agents are introducible via the inlet pipe 50 joined to end wall 51, the pipe being shown as having been pinched off at 50a and welded at 52.

At 53 is shown a paving slab in which the roadway branch 41 and chamber 43 are embedded, while the ground branch 40 and vessel 42 extend downwardly into the earth 54 through a predrilled hole 55. Usually a space (not shown) if formed between the vessel 42 and the walls of the hole, and this is desirably backfilled with an earth slurry or a liquid material such as "Aqua Gel" in order to bring the pipe into intimate thermal contact with the earth. Any suitable backfill material may be used, including earth itself. The layer 57 between the slab and the earth is a sub-base, usually comprising crushed stone, put on before pouring of concrete slab 53.

The operation of the device of FIG. 4 is like that described for FIG. 1. The FIG. 4 device is a preferred embodiment by reason of its sturdy construction.

In FIG. 7a the construction is more simple than in FIG. 4 in that chamber 43a omits the end wall 56 of chamber 43. Also, inner tube 34a is not bent but rather terminates in an upstanding portion 41a, which for purposes of description may be considered a roadway branch tube. Ground branch tube 40a, internal plate 46a, and and vessel 42a are the same as in FIG. 4.

In FIG. 7b a fitting 58 is used to receive the vertical vessel 42b and horizontal vessel or chamber 43b, these vessels being fitted into openings 58a and 58b and welded in place as at 59 and 59a. In other respects, FIG. 7b is like FIG. 7a. Use of a fitting like 58 is advantageous in eliminating the step of bending the pipes, and in avoiding the necessity of having to ship very long pipes to the installation site. Other means, such as threading, or both threading and welding, may be used to connect the pipes to the fitting.

In FIGS. 8–9 is shown the manner in which down-pumping pipes May alternate with up-pumping heat pipes in a roadway paving slab. The latter is shown at 60, the roadway branches (of varying length) of the down-pumping pipes at 61a – 72a (in dotted lines), and the condensers (also of varying lengths) of the up-pumping pipes at 73a – 84a (in broken lines). These roadway branches and condensers may be embedded in a substantially flat or horizontal position in the roadway slab, but it may be preferably to impart an upward tilt to the roadway branches, note branches 83a and 84a of FIG. 9, in order to facilitate maximum filling with working agent of down-pumping heat pipes such as those of FIGS. 4, 7a, and 7b. Also, it may be preferably to impart a downward tilt to the condensers, note 71a and 72a of FIG. 9, in order to promote gravity flow of working agent back into the vertical or evaporator lengths of the up-pumping pipes. In FIG. 8, the dots represent the vertical portions of the heat pipes, those being shown in part in FIG. 9, note 69b – 72b and 79b – 84b. As is apparent, the horizontal roadway branches and horizontal condensers extend at right angles to the road direction indicated by arrow A, and they are arranged to extend from both sides of the slab and, as noted, for varying lengths.

FIG. 10 shows a combination pipe comprising the down-pumping pipe having incorporated therein an up-pumping heat pipe having some similarity to the up-pumping pipe described in said copending case. As may be apparent, the down-pumping part of the device comprises the inner pipe or tube 89 from which are formed the angularly disposed intercommunicating ground and roadway branches or branch tubes 90, 91, the latter including or incorporating a chamber 92. The device also has an outer vessel 93 enclosing ground branch 90, a supply or argon 94, and ammonia 95, 95a. The foregoing are common to the down-pumping of FIGS. 1 and 4 and to the combination pipe. In the latter, vessel 93 has an angular extension 96 disposable in the roadway just below the surface thereof and enclosing the roadway branch 91 and parallel to the same. Intermediately of vessel 93, and well below extension 96, is an internal seal 97 which extends transversely between ground branch 90 and vessel 93, dividing the latter into the upper and lower compartments 98, 99.

Upper compartment 98 is in communication with extension 96, and in its lower portion and supported on seal 97 is a quantity of working agent, designated 95b, which suitably is ammonia but may be any other operative agent. Heat-dissipating fins 100, disposable in the ammonia, help to improve heat flow. A condensate distributing means in the form of an internal helical spring 101, is present in compartment 98 in substantial contact with walls 102, and interiorly of the spring is an unobstructed vapor channel 103. The condensate distributing means is described in detail in said copending case, but here it may be noted briefly that it comprises a multi-turn helical spring each turn of which is in good contact with walls 102. A spring whose turns tend to expand unless confined, i.e., an expandable spring, is a quite suitable helix as it promotes and maintains forced contact with walls 102, which in turn favors good continuous contact between condensate and the walls and thus promotes good absorption of earth heat by the condensate.

Argon 94 and ammonia 95 may be introduced to lower compartment 99 through the end wall 104 having the flared extension 105 in the manner described, and similarly ammonia 95b may be introduced to compartment 98 through end wall 106 having flared extension 107. During operation of the device, the ammonia will distribute itself in accordance with temperature and pressure differentials. It will be understood that prior to charging of these materials, the entire device will be evacuated of air and non-condensible gases.

During operation, ammonia 95b in compartment 98, during winter or cold weather time, receives earth heat passing through walls 102 and is vaporized, the vapors passing upwardly through channel 103 to extension 96 where they are condensed by the lower temperatures prevailing on the roadway surface, thereby releasing heat of condensation to the surface which is useful to melt ice and snow thereon. The resulting ammonia in extension 96 flows by gravity back into vessel 93, where it comes in contact with the coils of spring 101 which convert the flow from a more or less vertically falling stream to a more laterally and more slowly flowing one. In the result, the condensate is brought into good continuous contact with walls 102 of compartment and is able to absorb earth heat and be revaporized, thus continuing the cyclic process, Good heat transfer film coefficients are obtainable in compartment 98, and the unobstructed channel 103 provides a rapid, isothermal, and efficient transfer of heat from the earth to the roadway.

It is to be noted that the amount of ammonia 95b required is quite small; for example, in an up-pumping pipe measuring 75 ft. in length (vertical length of 60 ft.) and 1.06 inches internal diameter, the total amount of ammonia required was less than 400 gms., or less than one pound. The ammonia vapor pressure during operation may range from 67.3 psia at 36° F. to 107.6 psia at 60° F.

In summer or warm weather time the ammonia 95a in chamber 92 receives atmospheric and solar heat through the roadway and is vaporized, the vapors flowing through branches 91 and 90 to lower compartment 99 where they are condensed, at least in part, by the lower temperatures prevailing in the ground. Most of the ammonia vapors will condense in branch 90 in the vicinity of the fins or heat exchanger 100, but some of the vapors pass down branch 90 to mingle with the argon 94 in the space 88 over the condensed ammonia, forming a gaseous mixture. The heat of condensation of the vapors condensing in the vicinity of fins 100 passes to walls 102 and to the surrounding earth 108, thereby augmenting the natural supply of earth heat. Continuation of the process results in an increase in the pressure of the mixture in the confined space 88 until eventually the pressure becomes large enough to stop the flow downward of vaporized ammonia and, instead, to force condensed ammonia to flow back to chamber 92 via branches 90, 91. Such back-flow continues until equilibrium, and the liquid ammonia in chamber 92 is again in a position for a repetition of the process.

FIG. 11 shows a combination pipe like that of FIG. 10 but modified to the extent that the inner pipe 112 is revolved through an angle of 180° so that the roadway branch or branch tube 114 and chamber 115 extend outside of the vertical 116 while ground branch or branch tube 113 remains inside as before. With this construction the warm weather operation of the down-pumping part of the pipe is favored since atmospheric and solar heat can pass more directly to the ammonia in chamber 115. It may also be apparent that such chamber may be disposed at various other angles relatively to the vessel extension 127; in fact, it may be disposed at any angle that permits the chamber to be outside of the extension so that heat may enter it without first passing through said extension.

In other respects the device of FIG. 11 is like FIG. 10, comprising, in addition to the described structures, the seal 117 which divides vessel 116 into upper and lower compartments 118, 119, fins 120, ammonia 121, 121a, and 121b, argon 122, condensate distributing means 123, and wall construction at 124 for introducing ammonia in the manner described, and, in chamber 115, an apertured end wall 125 with flared extension 126 for introduction or argon and ammonia as described. The roadway branch 114 may be tilted differently from extension 127, branch 114 being tilted upwardly to position the extension 126 a bit higher than as shown to facilitate filling; while extension 127 may be tilted to favor gravity back flow of working agent, i.e., the right hand end being made higher than the left hand end as seen in FIG. 11.

FIGS. 12 and 13 illustrate a way in which the combination pipe of FIG. 11 may be positioned relatively to a highway paving slab 130. Here the roadway branches 114a – 114e and chambers 115a –115e are not only substantially parallel to each other but are disposed at right angles to the roadway direction indicated at arrow B, and the chambers alternate, one being on the left hand side and the next on the right hand side, etc. Similarly, the vessel extensions 127a – 127e alternate in the same way. The outer vertical vessels, two of which are seen at 116d and 116c, extend substantially vertically into the earth 128.

The modification of FIG. 14 incorporates advantages of both FIGS. 10 and 11. The extension 132 of outer vessel 131 and the roadway branch tube 133 are considerably elongated over FIG. 10 and thus provide ample means for the up-pumping pipe operation to supply heat to the roadway surface. The chamber 134, which is separated from extension 132 by a wall 135, is able to receive roadway heat which passes only through a single wall 136, as in FIG. 11.

Regarding the combination pipes of FIGS. 10, 11, and 14, it will be observed that in each the ground branch tubes are enclosed in the ground vessels. In each too, the roadway or area branch tubes are parallel to the roadway or area vessels, or chambers. In FIGS. 10 and 14 the area branch tubes are enclosed in the area vessels, while in FIG. 11 the area branch tube extends outside of the area vessel.

In general, the roadway branches and chambers may be of the same or varying lengths, may extend at right angles to the roadway direction, may enter the roadway slab from one or both sides, may extend either entirely across the roadway, as in the case of a flat road, or, as in the case of a crown road, only half way across from both sides, and may lie substantially horizontally in the paving slab or, particularly in the case of a combination pipe, may have a downward tilt. These roadway branches and chambers may also extend in a direction parallel to the roadway length, in which case they are preferably staggered or offset in a lengthwise direction, note FIGS. 17–18 of said copending case. The ground branches of the down-pumping pipes may extend substantially vertically into the ground or may diverge to either side of the roadway, as in FIGS. 17–18 of said copending case.

With argon as the non-condensible gas and ammonia as the working agent, an idea of the argon partial pressures and roadway temperatures required to permit heat to be pumped down and liquid ammonia to be pumped up may be gained from the following table. The table is applicable to the down-pumping pipe of FIG. 4 having the ammonia depths there shown, i.e., the depth at 49 is the same as the depth at 49a, and is based on a length of vessel 42 of 60 ft. Also a summer time ground temperature of 50° F. is assumed, applicable to a climate somewhat north of Baltimore. It should be noted that at 50° F. anhydrous ammonia has a vapor pressure of 89.19 psia, and a 60-ft. column of liquid ammonia exerts a pressure of 16.25 psi.

TABLE

| Argon Partial Pressure psia | Ammonia Partial Pressure psia | Total Pressure psia | Roadway Temperature at which Heat May Be Pumped Down ° F. | Roadway Temperature at Which Ammonia May Be Pumped Up ° F. |
|---|---|---|---|---|
| 0 | 89.19 | 89.19 | 50 or more | 39 or less |
| 10 | 89.19 | 99.19 | 56 or more | 46 or less[1] |
| 20.73 | 89.19 | 109.92 | 61 or more | 52 or less[2] |
| 31.10 | 89.19 | 120.29 | 66 or more | 58 or less |
| 41.47 | 89.19 | 130.66 | 71 or more | 63 or less |
| 51.83 | 89.19 | 141.02 | 75.5 or more | 68 or less |
| 62.20 | 89.19 | 151.38 | 79.5 or more | 73 or less |
| 72.56 | 89.19 | 161.75 | 83 or more | 77 or less |
| 82.93 | 89.19 | 172.12 | 87 or more | 80 or less |

Notes:
[1] especially in northern climates
[2] especially at night

According to the Table, when no argon is present, and when the roadway and ground temperatures are each 50° F., no heat will be pumped down; and to permit ammonia to be pumped up, the roadway temperature would have to be 39° F. or less which is difficult to achive during summer time. At 10 and 20 psia argon, heat may be pumped down at roadway temperatures of 56° and 61° F., or higher, which are attainable summer temperatures, and ammonia may be lifted at roadway temperatures of 46° and 52° F., or less, which may not be readily attainable in summer at the climate in question. At 31.10 psia argon, and going up to 82.93 psia argon, the roadway temperatures are rather common summertime values, and for this reason the argon concentration in the argon-ammonia gaseous mixture in space 48 is preferably in the range of 30 to 82.83, or 85, psia. As will be understood, and in accordance with Dalton's law of partial pressures, the pressure exerted by such gaseous mixture is equal to the sum of the separate pressures which each gas would exert if it alone occupied the whole of space 48. The presure of the ammonia in the mixture is 89.19 psia, that being the pressure of saturated ammonia at 50° F. Thus, by varying the pressure of only the argon in the mixture, one can achieve down-pumping of heat over a suitable range of roadway summer temperatures; and at these temperatures the pressure in chamber 43, which may or may not be completely emptied of liquid ammonia, is sufficiently reduced to permit liquid ammonia, driven by the higher pressure in space 48, to flow from vessel 42 through the ground and roadway branches 40 and 41 back into chamber 43.

It will be understood that a similar table can be prepared for a geographical region having a different average summer time ground temperature, and also that appropriate changes can be readily made in the table in the event that a different non-condensible gas and/or working agent are used.

Anhydrous ammonia, $NH_3$, is a preferred working agent. Other agents are suitable which exhibit a reasonable vapor pressure of 5 or 10 to 200 psia at about 50° F.; are reasonably safe to handle; are compatible with the pipe materials; are capable of being alternatively vaporized and condensed under the conditions of use; and are reasonably priced. They may include the following, alone or in combination with one or more others;

| "Freon" 14 | $CF_4$ | "Freon" 22 | $CHClF_2$ |
|---|---|---|---|
| "Freon" 503 | $CHF_3/CClF_3$ | "Freon" 115 | $CClF_2CF_3$ |
| "Freon" 23 | $CHF_3$ | "Freon" 500 | $CCl_2F_2/CH_3CHF_2$ |
| "Freon" 13 | $CClF_3$ | "Freon" 12 | $CCl_2F_2$ |
| "Freon" 116 | $CF_3CF_3$ | "Freon" C-318 | $C_4F_8$ (cyclic) |
| "Freon" 13B1 | $CBrF_3$ | "Freon" 114 | $CClF_2CClF_2$ |
| "Freon" 502 | $CHClF_2/CClF_2CF_3$ | "Freon" 21 | $CHCl_2F$ |

Also alcohols like methanol; hydrocarbons like ethane, ethylene, and propane; and compounds like methyl chloride, ethyl chloride, methol formate, ethylamine, sulfur dioxide, etc., and including other agents set forth in said copending case. It is desirable that the agent show a reasonable vapor pressure at 50° F. and up because down-pumping pipes may be expected to operate at such temperatures. The agent should not react with the material of the pipes, even to a small extend, to avoid formation of non-condensible gases which may accumulate, and thus alter the pre-selected pressure of the argon-ammonia mixture. Working agents for the combination pipe can be the same or different.

The inert non-condensible gas may also be selected from other inert noble gases such as helium, krypton, neon, and xenon; other inert gases may be chosen from nitrogen, air, carbon dioxide, and the like. The gas should be anhydrous, chemically inert and insoluble in the working agent and pipe materials.

The numerical dimensions of the pipes are variable, depending on roadway material, geographical location, earth temperatures at various depths, etc., but for the outer vertical vessel the length may extend from 6 to 60, 50, or 70 ft., preferably from 20 to 50 ft.; for the horizontal vessel (note 96 of FIG. 10 and 127 of FIG. 11) the length may vary from 7 or 8 to 14 or 15 ft., although lengths of up to 75 ft. may be in order for applications like airport runways, and for FIG. 11 these dimensions may be doubled, as may also be the case for FIG. 14. Pipe diameters for these vessels range from ¾ to 3 or more inches, and wall thicknesses from ⅛ to ¼ inch. When disposed in a paving slab, the horizontal vessels may be spaced apart 3 or 4 to 6, 8, 10 or more inches, and the distance from the pipe to the roadway surface may vary from 1.25 or 1.5 to 2, 2.5, or 3 inches. Vertical vessels at their bottom ends may be 5 to 9 ft. apart. The ground and roadway branch tubes are of comparable but somewhat shorter lengths, and preferably with diameters approximately half of those of said vessels. Roadway branch tubes include the chambers; thus, in FIG. 4 the roadway branch comprises length 41 plus chamber 43, and the diameter of the latter will approximate that of vessel 42.

Helical springs for the combination pipe may be 15 or 20 to 60 ft. in length with diameters slightly greater than that of the vessel so as to require a force fit in the latter. As an example, an ordinary compression spring may be used, taking care that its free length corresponds to the desired length of spring; to install the same, one can wind the precursor strand on a long mandrel until its diameter is smaller than the vessel inside diameter, then temporarily restrain the ends of the tensioned spring in any suitable way and insert both spring and mandrel in the vessel. After insertion, the spring ends are released, at which point the spring increases in diameter and becomes restrained by the pipe. The mandrel can then be withdrawn, leaving the spring in the vessel. The spring may have a variable number of turns, say 1 to 12, preferably 6 to 12, turns per foot. Spring materials are conventional, including steel, stainless steel, music wire, and the like. The distributing means may have other forms than a multi-turn helical spring, although the latter is preferred for the long circuitous path it provides, ease of installation, inexpensiveness, and effectiveness. However, as illustrated in FIGS. 8-11 of said copending case, one may also use a plurality of longitudinally spaced rings, or partial discs, or grooves, all having a hollow interior or aperture to form an unobstructed channel for agent vapors.

Regarding the evacuation and outgassing of the pipes, this step may follow the welding on of the end caps or walls having fill tubes attached, note FIGS. 5 and 6. Suitably a valve, such as 25 in FIGS. 1 and 7, is connected to the fill tube and its outboard side connected to a high capacity vacuum pump manifold. A group of pipes may be so connected to the manifold. The pipes are heated, as by an electrical resistance wire, to a minimum temperature of 200° F. and outgassed until a hard vacuum is obtained, after which the valves are tightly closed, the pump disconnected, and the pipes allowed to cool to room temperature. Each pipe is then charged with working agent, using conventional means. Verification is next carried out to insure that each pipe has the proper charge, the procedure comprising heating the bottom of the pipe to 120° F.; after a few minutes the top should become warm to the touch, showing that the pipe is isothermal at 120° F. Then the fill tube (note 31 of FIG. 7) is pinched off, the valve is removed, and the fill tube end is welded as at 30 of FIG. 1. It is to be noted that each pipe is not merely sealed but hermetically sealed so as to be leakproof and vacuum tight, with agent prevented from leaking out and air from entering.

While pipes and distributing means of circular cross-section are preferred, the invention is operative for non-circular or polygonal cross-sections, such as those having 3, 4, 5, 6, 7, 8, etc. sides. The term "pipe" will be understood to be inclusive of vessels, conduits, or ducts of both circular or non-circular cross section.

Roadway paving slabs are of conventional dimensions, i.e., thicknesses of about 9 inches, lengths of 20 to 60 ft., and widths of 12 to 16 ft. The invention is applicable to any conventional roadway material, including concrete, bituminous concrete roads of 1 inch or more thickness, rigid pavements of portland cement-concrete with or without a bituminous wearing surface of up to 1 inch, concrete pavements resurfaced with 2 inches of bituminous mat, mixed bituminous roads, bituminous penetrated roads, brick roads, block roads, and roads of gravel, stone, or soil mixed or unmixed. Where the wear-resisting surface is too thin to permit embedding of the pipes, it is feasible to lay the pipes immediately underneath the roadway and preferably in contact with such surface. The invention is of secial importance to critical locations such as sharp curves, steep hills, speed change langes, ramps, bridge decks and approaches, etc., where considerations of safety outweigh costs. It is of further use of airport runways, taxiways, and aprons; also for private car parking lots, private drives and parking lots, sidewalks, stairs, etc.; also for keeping water drinking troughs and hand rails icefree, for unheaed warehouses by embeddment in the floors, etc. The term "area" should be understood as inclusive of all of the foregoing applications. The expression "associated ground" is intended to mean ground below and adjacent to a paving slab into which the pipes may extend.

Pipe materials should be compatible with roadway materials and working agents and non-condensible gases, and suitably may be of stainless steel types 304, 306, etc., also steel of SAE Nos. 1006, 1018, etc., or ASTM A53, A106, A120, etc. Fins may be present on the external surfaces of the pipes to promote heat transfer.

The invention may be illustrated by the following example involving FIGS. 1 and 3a.

EXAMPLE

The down-pumping heat pipe of FIGS. 1 and 3a was constructed for testing. Its vertical or ground branch tube 10 was 63 inches long and the horizontal or roadway branch tube 11 was 3½ inches long, both made of 0.375-inch diameter 0.035-inch diameter 0.035 -inch thick copper tubing bent as indicated. Outer vertical vessel 12 enclosing branch 10, and welded thereto, was of copper, 60 inches long, 1 inch in diameter, wall thickness of 0.035 inch, while outer horizontal vessel or chamber 14, also of copper, was 18 inches long, 1 inch in diameter, and 0.035 inch thick, and was welded to branch 11. Around vessel 12 was wrapped a copper tube or coil (not shown) of 0.25 inch diameter for cooling water; it was soldered in place to get good contact.

To the top of chamber 14 a flat plate 38 was soldered, measuring 14 inches by 6 inches by 1/16 inch (FIG. 3a), and a Minco electric heater 33, 14 inches long, was attached to the top of it to provide heat, thus simulating heat from the atmosphere and the sun. A variac (now shown) was connected to the heater to permit adjustment of power, and a wattmeter (not shown) measured the power input. Chamber 14 was then insulated to reduce heat loss. Thus, electrical energy applied to the Minco heater as converted to heat which boiled the ammonia in chamber 14.

Branches 10 and 11 had open ends, while vessel 12 and chamber 14 were closed at both ends, as indicated. All joints were vacuum tight. The entire system was evacuated of air and non-condensible gases.

Vessel 12 was charged with $3.4 \times 10^{-5}$ kilogram-moles of argon gas, followed by 328 cc liquid ammonia, $NH_3$, using the inlet tube 26 to which valve 25 was attached. This quantity of ammonia was sufficient to fill branches 10 and 11 (about 70 cc) and chamber 14 (about 200 cc) and to provide an amount in the bottom of vessel 12 to cover the lower open end 13 of branch 10.

The copper coil wrapped around vessel 12 was connected to a source of cooling water and water at 55° F. pumped through.

At the start of the test, the ammonia may be considered to be positioned as shown in FIG. 1. Its temperature in chamber 14 was 75° F. and its pressure 140.4 psia. The heater was turned on to apply a constant power of 30 watts, and the temperature in chamber 14 increased gradually for about 10 minutes to 93° F., the ammonia pressure reaching 189.7 psia, and the ammonia in branch 10 being pushed down from the level at 23 until its level coincided with the bottom or open end 13. Actually, most of the pressure increase from 140.4 to 189.7 psia was expended against the pressure of the argon in vessel 12.

Heating was continued, and over a period of 70 minutes the temperature of the ammonia in chamber 14 increases gradually to 97° F. Ammonia was driven out of chamber 14 as vapor, and it emerged from the bottom of branch 10, where it bubbled through the pool of liquid ammonia in the bottom of vessel 12. Since such vapor at a temperature near or somewhat greater than 93° F., it condenses in vessel 12, whose temperature is kept at or near 55° F. by the cooling coil, and thus adds to the pool of liquid ammonia. The small rise in temperature of the ammonia vapor from 93° to 97° F. is thought to be due to further compression of the argon in vessel 12 by the incoming ammonia.

As ammonia condenses in vessel 12, it of course releases heat of condensation, which is thus made available to the lateral walls 19 of such vessel, and if the device were in position in a roadway and the associated earth, such heat would pass to the earth and replace or replenish the natural supply. In effect, the device is pumping heat down from chamber 14 (which would be in the roadway) to vessel 12 (which would be in the earth).

Following the described 70-minute period, the temperature in chamber 14 rose sharply to 132° F. before power to the heater was shut off. This sudden increase indicated that all ammonia in chamber 14 had evaporated. After power shut-off, the temperature in chamber 14 fell quickly over a period of 50 minutes, reaching 77° F. Thereafter the argon pressure in vessel 12 made itself felt, pushing liquid ammonia out of vessel 12 into branch and then into chamber 14, a movement that continued until the latter is filled, as indicated in FIG. 1.

In the test, chamber 14 was found initially to contain 134 cc liquid ammonia (80 grams) for the condition shown in FIG. 1. To vaporize this amount of ammonia required, by calculation, an input of 27.2 watt-hours, but actually 35.0 watt-hours were used, the difference being attributed to heat losses. Substantially all of the latent heat of condensation of the ammonia (134 cc) in chamber 14 was thus transferred to vessel 12. This point may be demonstrated by considering that the heat of vaporization of ammonia is 0.34 watt-hour per gram, and for 80 grams the heat required for vaporization is 80 $\times$ 0.34 or 27.2 watt-hours. On the other hand, the constant power supplied by the heater was 30 watts, and this was supplied for an average heating time of 68.3 minutes, or 30 $\times$ 68.3 $\times$ 1/60 or 34.2 watt-hours. The heating time of 68.3 minutes is the average of three runs of 70, 67, and 68 minutes. The quantity 34.2 watt-hours is considered to agree well with 27.2 watt-hours.

It may be noted, too, that since substantially 34.2 watt-hours were required for each of the three runs, it follows that substantially the same amount of liquid ammonia was lifted from vertical vessel 12 to horizontal chamber 14 in each run.

The foregoing concludes the example.

To recapitulate briefly, it is apparent that each modification shown comprises two angularly disposed vessels, an upper and a lower, e.g. 43 and 42 of FIG. 4 or 92 and 99 of FIG. 10, and that there is an elongated tube enclosed in the lower vessel having an upper and a lower portion. In some modifications the upper tube portion comprises a horizontal branch tube, e.g. 41 in FIG. 4 or 133 in FIG. 14, and in some it is simply a short length of vertically diposed tube, as at 41a of FIG. 7a. This elongated tube provides communication between the two vessels. The upper vessel is associated with the upper tube portion, and the lower vessel with the lower tube portion. A working agent is present in the lower vessel and is able to flow through the tube to the upper vessel, and a non-condensible gas is confined in the lower vessel above the level of working agent but is not able to flow through the tube to the upper vessel.

In the combination pipes of FIGS. 10, 11, and 14, the upper compartments, as at 98 and 118 of FIGS. 10 and 11, which are also termed vessels, have vessel extensions as at 96, 127, and 132 of FIGS. 10, 11, and 14. These vessel extensions are actually condensers for the agent vapors flowing upwardly from the agent reservoir adjacent the heat-dissipating fins. The said upper compartments are actually evaporators.

It will be understood that the invention is capable of obvious variations without departing from its scope.

In the light of the foregoing description, the following is claimed.

We claim:

1. A down-pumping heat pipe comprising a pair of angularly disposed upper and lower vessels, an elongated tube enclosed in the lower vessel and providing communication between the vessels, a working agent in the lower vessel able to flow through said tube to the upper vessel, a non-condensible gas in the lower vessel above the level of working agent therein but prevented by said agent from flowing into said tube and upper vessel, and said tube and vessels being substantially evacuated prior to introduction of said agent and gas.

2. A down-pumping heat pipe comprising two angularly disposed vessels one of which is disposable substantially vertically in the ground associated with an area and the other of which is disposable substantially horizontally just below the surface of said area, a tube enclosed in said ground vessel and at the lower end portion thereof being in communication with such vessel, said tube at the upper end portion thereof being in communication with said area vessel, said tube providing communication between the vessels, a working agent in the bottom portion of the ground vessel and in said area vessel, an inert non-condensible gas in the ground vessel above the level of said agent, a seal in the ground vessel confining said gas between itself and said agent level, and said vessels and tube being substantially evacuated prior to introduction of said agent and gas.

3. A down-pumping heat pipe for use in association with an uppumping heat pipe in an area travelled by wheeled vehicles including aircraft, said area in winter time owing to the presence of the up-pumping pipe being capable of maintaining itself free of ice and snow accumulations by utilizing natural earth heat to melt the same and in summer time owing to the presence of the down-pumping pipe being capable of replenishing earth heat by adding thereto heat from the atmosphere and from solar radiation, said down-pumping pipe comprising two angularly disposed vessels one of which is insertable substantially vertically in the ground below and/or adjacent said area and the other of which is disposable substantially horizontally in the area just below the surface thereof, an inner tube enclosed by said ground vessel and having an open lower end portion by means of which the tube is in communication with the ground vessel, said tube at its upper end portion being in communication with said area vessel, a quantity of non-condensible gas in the ground vessel, an amount of working agent in the down-pumping which in summer time is vaporizable in the area vessel by atmospheric and solar heat and is condensible in the ground vessel by the lower temperatures prevailing in the ground, the vaporized agent being able to flow from the area vessel through said tube to the ground vessel where it encounters said non-condensible gas, at least part of the vaporized agent being condensed in said ground vessel, thereby releasing heat of condensation to walls of the vessel and to the surrounding earth, and part of the vaporized agent mixing with said gas in the ground vessel, thereby increasing the pressure of the resulting mixture therein, said gaseous mixture eventually receiving so much vaporized agent as to attain a pressure large enough to force condensed agent back through said tube to the area vessel where it may again be vaporized by the higher temperatures prevailing on the area surface, and said down-pumping pipe being evacuated prior to introduction of said agent and gas.

4. Down-pumping heat pipe of claim 3 wherein the area vessel comprises a chamber in which condensed agent may collect.

5. A combination heat pipe comprising a down-pumping heat pipe having an up-pumping heat pipe incorporated therewith, said down-pumping pipe having two angularly disposed vessels one of which is disposable in the ground associated with an area and the other of which is disposable just below the surface of said area, an internal seal at an intermediate place in the ground vessel which divides the latter into upper and lower compartments, an inner tube enclosed in said ground vessel and extending through said upper compartment and seal and into said lower compartment, said tube at its lower end being in communication with the lower compartment and at its upper end in communication with the area vessel, a first working agent in the bottom of the lower compartment and also in the area vessel, an inert non-condensible gas in the lower compartment above the level of working agent therein, a second working agent in the upper compartment supported on said seal, a vessel extension disposed below said area surface for receiving agent vapors from the upper compartment, and condensate distributing means in the upper compartment having a free unobstructed channel therein, and said combination pipe being evacuated prior to introduction of said agents and gas.

6. Combination pipe of claim 5 wherein said vessel extension encloses said area vessel.

7. Combination pipe of claim 5 wherein said vessel extension extends angularly of said area vessel.

8. Combination pipe of claim 5 wherein said vessel extension is elongated and said area vessel is disposed at the end thereof.

9. Combination pipe of claim 5 wherein heat-dissipating fins are present in the upper compartment and are supported on said inner tube.

10. In an improved roadway having means for melting ice and snow thereon comprising at least one paving slab supported on a foundation of earth, and wherein said means comprise a plurality of up-pumping heat pipes operatively associated with the roadway,
- the improvement comprising a plurality of down-pumping heat pipes operatively associated with the roadway which in warm weather are capable of replenishing earth heat by adding thereto heat from the atmosphere and from solar radiation,
- each said down-pumping pipe comprising two vessels one of which is disposable in the grond below and/or adjacent to the roadway and the other of which is disposable in the roadway just below the surface thereof,
- an inner tube enclosed by said ground vessel and in communication therewith and also with said roadway vessel, a quantity of noncondensible gas in the ground vessel,
- an amount of working agent in the down-pumping pipe which in warm weather is vaporizable in the roadway vessel by atmosheric and solar heat and is condensible in the ground vessel by the lower temperatures prevailing in the ground, the vaporized agent flowing from the roadway vessel through the tube to the ground vessel where it encounters said gas, at least part of the vaporized agent being condensed in the ground vessel, thereby releasing heat of condensation to walls of the ground vessel and the surrounding earth, and part of the vaporized agent mixing with said gas, thereby increasing the pressure of the resulting mixture, said mixture eventually receiving so much vaporized agent as to attain a pressure large enough to force condensed agent back to the roadway vessel where it may again be vaporized by the higher temperatures on the roadway surface, and said pipes being evacuated prior to introduction of said agent and gas.

* * * * *

UNITED STATES PATENT OFFICE
CERTIFICATE OF CORRECTION

Patent No. 4,050,509   Dated September 27, 1977

Inventor(s) Walter B. Bienert et al.

It is certified that error appears in the above-identified patent and that said Letters Patent are hereby corrected as shown below:

Column 5, lines 13 and 17, "preferably" should read -- preferable --; line 39, "or" should read -- of --. Column 10, line 68, "secial" should read -- special --. Column 11, line 2, "langes" should read -- lanes --; line 4, "of", second occurrence, should read -- for --; line 8, "heaed" should read -- heated - ; line 29, delete "0.035-inch diameter"; line 43, "now" should read -- not --; line 48, "as" should read -- was --. Column 12, line 14, "is" should follow "vapor". Column 14, line 10, "pipe" should follow "down-pumping". Column 15, line 15, "grond" should read -- ground --.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*